US012462962B2

(12) United States Patent
Francis

(10) Patent No.: US 12,462,962 B2
(45) Date of Patent: Nov. 4, 2025

(54) SURFACE-MOUNTED MAGNETIC-COMPONENT MODULE

(71) Applicant: Murata Manufacturing Co., Ltd., Nagaokakyo (JP)

(72) Inventor: Lee Francis, Milton Keynes (GB)

(73) Assignee: MURATA MANUFACTURING CO., LTD., Kyoto (JP)

(*) Notice: Subject to any disclaimer, the term of this patent is extended or adjusted under 35 U.S.C. 154(b) by 971 days.

(21) Appl. No.: 17/568,853

(22) PCT Filed: Jul. 9, 2020

(86) PCT No.: PCT/US2020/041355
§ 371 (c)(1),
(2) Date: Jan. 5, 2022

(87) PCT Pub. No.: WO2021/007406
PCT Pub. Date: Jan. 14, 2021

(65) Prior Publication Data

US 2022/0310300 A1 Sep. 29, 2022

Related U.S. Application Data

(60) Provisional application No. 62/871,854, filed on Jul. 9, 2019.

(51) Int. Cl.
*H01F 27/02* (2006.01)
*H01F 27/26* (2006.01)
*H01F 27/30* (2006.01)

(52) U.S. Cl.
CPC ......... *H01F 27/022* (2013.01); *H01F 27/266* (2013.01); *H01F 27/306* (2013.01)

(58) Field of Classification Search
CPC ..... H01F 27/266; H01F 27/022; H01F 17/062
USPC .......................................... 336/90, 208, 196
See application file for complete search history.

(56) References Cited

U.S. PATENT DOCUMENTS 4,103,267 A 7/1978 Olschewski
10,062,495 B2 8/2018 Lloyd
2008/0186124 A1 8/2008 Schaffer et al.
2010/0156584 A1 6/2010 Yamaguchi et al.
2014/0340186 A1 11/2014 Xianfeng et al.
2016/0111199 A1* 4/2016 Quilici .................... H01F 27/29 336/200
2016/0254090 A1 9/2016 Lloyd (Continued)

FOREIGN PATENT DOCUMENTS

CN 101553890 A 10/2009
KR 20160001626 * 1/2016 ............. H01F 17/06
WO WO-9856016 A1 * 12/1998 ......... H01F 17/0033

OTHER PUBLICATIONS

Francis et al., "Surface-Mounted Magnetic-Component Module", U.S. Appl. No. 16/924,240, filed Jul. 9, 2020.

(Continued)

*Primary Examiner* — Lincoln D Donovan
(74) *Attorney, Agent, or Firm* — Keating & Bennett, LLP

(57) ABSTRACT

A magnetic-component module includes a first header, a core on the first header, and a winding including a first trace on the first header. The first header includes a disc-shaped portion that supports the core and a cylinder-shaped portion that receives a hole of the core.

20 Claims, 12 Drawing Sheets

(56) References Cited

U.S. PATENT DOCUMENTS

2016/0254091 A1* 9/2016 Harber .................. H01F 41/046
336/221
2019/0385777 A1* 12/2019 Feng .................. H01F 17/0033
336/200

OTHER PUBLICATIONS

Francis et al., "Surface-Mounted Magnetic-Component Module", International Application No. PCT/US20/41349, filed Jul. 9, 2020.
Francis et al., "Surface-Mounted Magnetic-Component Module", International Application No. PCT/US20/41351, filed Jul. 9, 2020.
Francis et al., "Surface-Mounted Magnetic-Component Module", U.S. Appl. No. 16/924,666, filed Jul. 9, 2020.
Francis et al., "Surface-Mounted Magnetic-Component Module", U.S. Appl. No. 16/924,668, filed Jul. 9, 2020.
Francis, "Surface-Mounted Magnetic-Component Module", U.S. Appl. No. 16/924,670, filed Jul. 9, 2020.
Official Communication issued in International Patent Application No. PCT/US2020/041355, mailed on Oct. 22, 2020.
First Office Action in CN202080050005.9, mailed Mar. 30, 2024, 10 pages.

* cited by examiner

SURFACE-MOUNTED MAGNETIC-COMPONENT MODULE

CROSS REFERENCE TO RELATED APPLICATIONS

This application claims the benefit of U.S. Patent Application No. 62/871,854 filed on Jul. 9, 2019. The entire contents of this application are hereby incorporated by reference.

BACKGROUND OF THE INVENTION

1. Field of the Invention

The present invention relates to magnetic components and magnetic-component modules, and in particular, to transformers and surface-mounted transformer modules.

2. Background

Transformers are used in many applications, for example, to change the voltage of input electricity. A transformer has one or more primary windings and one or more secondary windings wound around a common core of magnetic material. The primary winding(s) receive electrical energy, such as from a power source, and couples this energy to the secondary winding(s) by a changing magnetic field. The energy appears as an electromagnetic force across the secondary winding(s). The voltage produced in the secondary winding(s) is related to the voltage in the primary winding(s) by the turns ratio between the primary and secondary windings. Typical transformers are implemented using an arrangement of adjacent coils. In a toroidal transformer, the windings wind around a toroid-shaped core.

Demands in many fields, including telecommunications, implantable medical devices, and battery-operated wireless devices, for example, have prompted design efforts to minimize the size of components with lower-cost solutions that exhibit the same or better performance but operate with reduced power consumption. The reduced power consumption is often prompted by further requirements in lowering supply voltages to various circuits. Accordingly, there is a continuing need to provide more efficient, smaller, and lower cost transformers.

SUMMARY OF THE INVENTION

To overcome the problems and satisfy the needs described above, preferred embodiments of the present invention provide magnetic-component modules each including a substrate, a header on the substrate that includes a disc-shaped portion that supports a core and a cylinder-shaped portion that receives a hole of the core, and a winding including a trace on the header.

According to a preferred embodiment of the present invention, a magnetic-component module includes a first header, a core on the first header, and a winding including a first trace on the first header. The first header includes a disc-shaped portion that supports the core and a cylinder-shaped portion that receives a hole of the core.

The magnetic-component module can further include a core standoff between the first header and the core. The first trace can be electrically connected to a substrate.

The magnetic-component module can further include a second header including a second trace. The second header can be stacked on the first header. The magnetic-component module can further include a first wire bond over the core and connecting a first trace on the first header to a second trace on the first header, and a second wire bond over the core and connecting a first trace on the second header to a second trace on the second header. The magnetic-component module can further include an overmold material encapsulating the first header, the core, the second header, the first wire bond, and the second wire bond.

The first header can include standoffs that electrically connect the winding to a substrate, and overmold material can encapsulate a portion of the first header. Electrical components can be mounted on the substrate between the first header and the substrate.

The magnetic-component module can further include a wire bond over the core and connecting a first trace on the first header to a second trace on the first header. The magnetic-component module can further include an overmold material encapsulating the first header, the core, and the wire bond.

According to a preferred embodiment of the present invention, a magnetic-component module includes a first header having a cup shape with inner and outer rims, a core on the first header, and a winding that includes a first trace on the first header and a first wire bond extending between the inner and outer rims of the first header and connected to the first trace.

The magnetic-component module can further include a core standoff between the first header and the core. The magnetic-component module can further include a second header that has a cup shape with inner and outer rims, that includes a second trace, and that is stacked on the first header. The magnetic-component module can further include a second wire bond extending between the inner and outer rims of the second header and connected to the second trace.

The first header can include standoffs that electrically connect the winding to a substrate, and overmold material can encapsulate a portion of the first header. Electrical components can be mounted on the substrate between the first header and the substrate. The magnetic-component module can further include overmold material encapsulating the first header, the core, and the wire bond.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
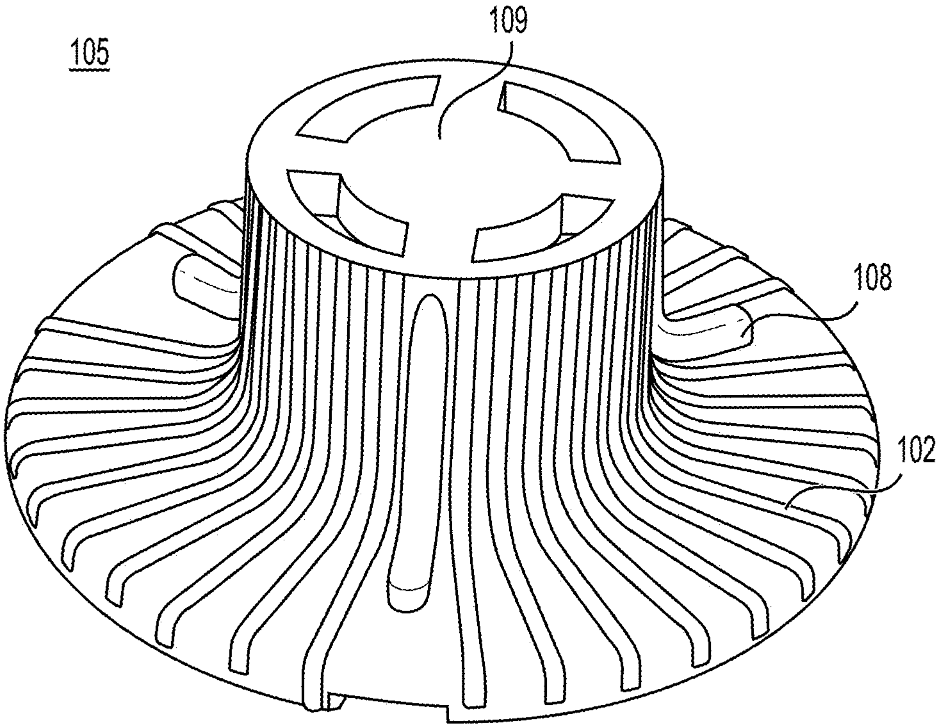
FIGS. 1 and 2 show a header with plated windings.
Figure 2:
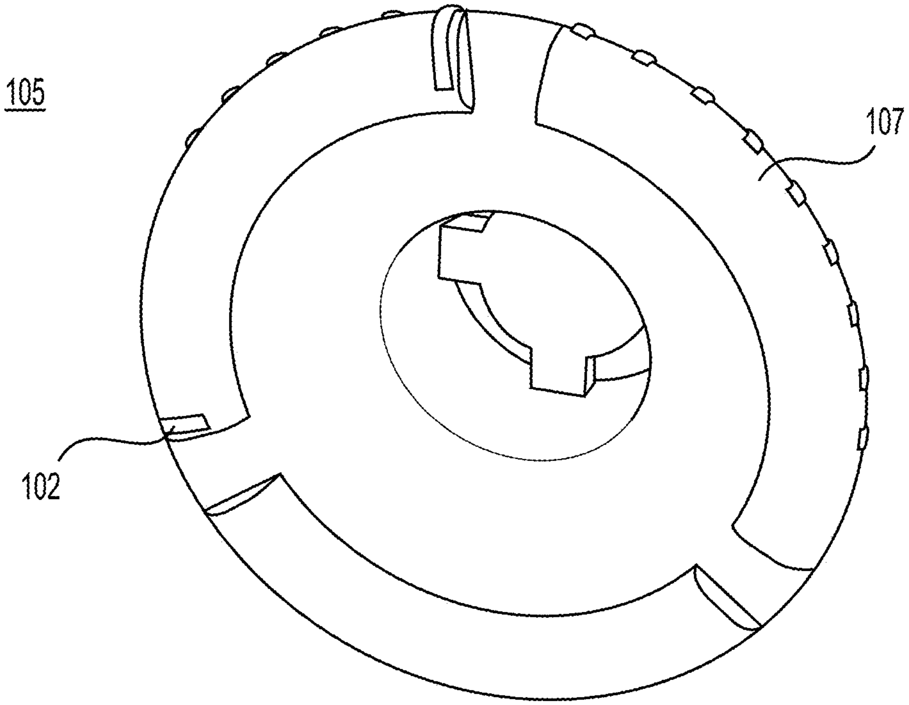
Figure 3:
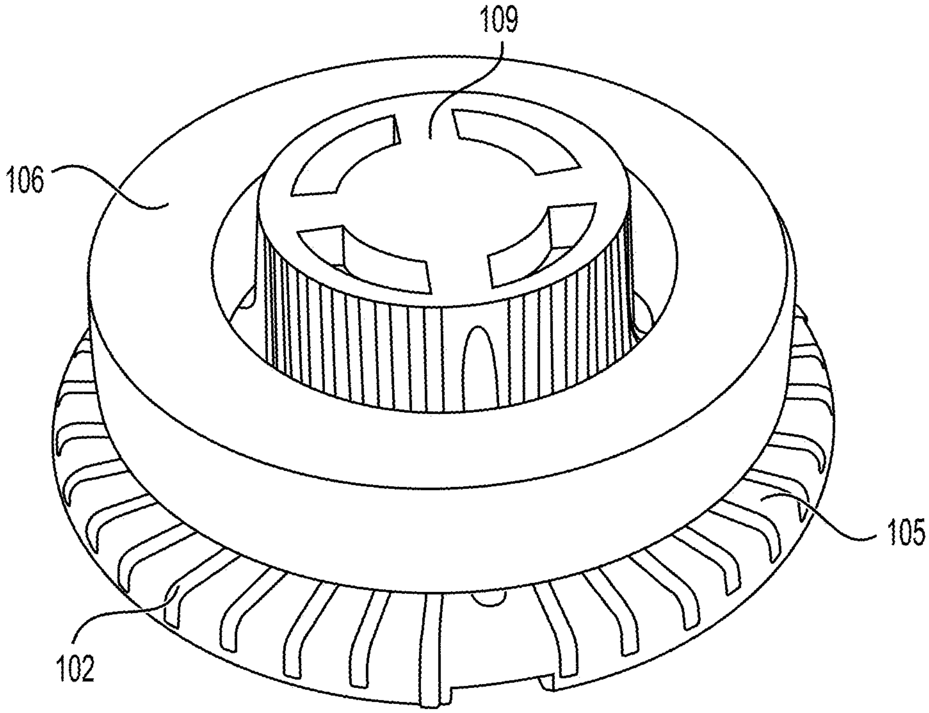
FIG. 3 shows a header and a core.
Figure 4:
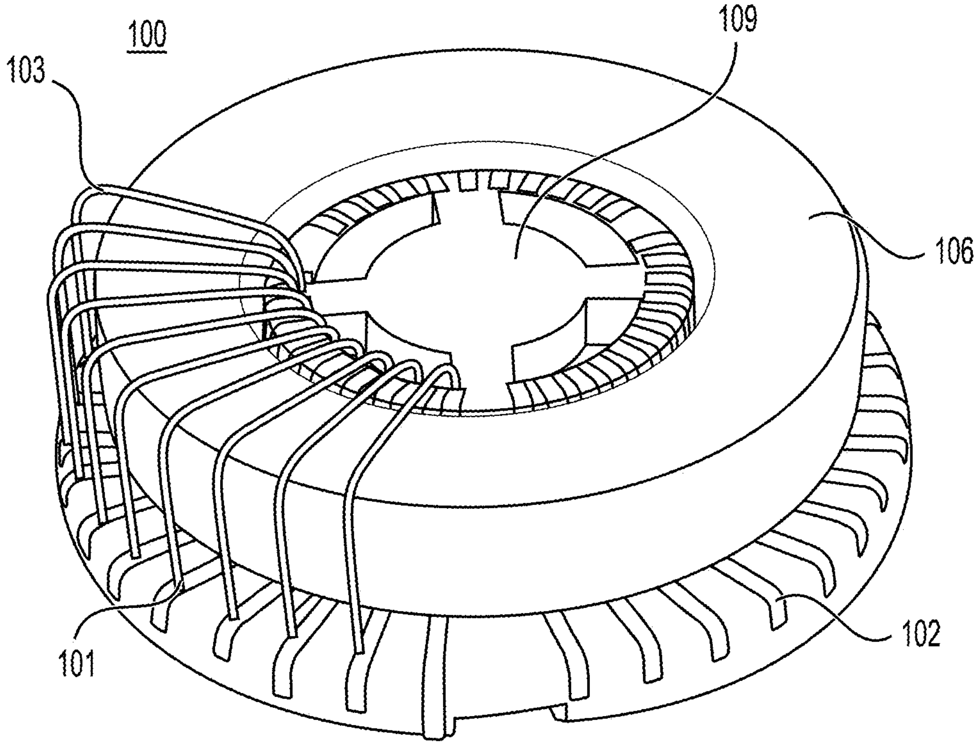
FIG. 4 shows a header and a core with wire bonds.

FIGS. 1-4 show a magnetic-component module 100 with a core 106, winding(s) 101, and a header 105. The windings 101 can be defined by traces 102 on the header 105 and by wire bonds 103 over the core 106. FIGS. 1 and 2 show the header 105. The header 105 can be made by molding and can include traces 102 and core standoffs 108. The traces 102 defining the windings 101 can be provided by plating, vapor deposition, or any other suitable process. FIG. 3 shows a core 106 on the header 105. FIG. 4 shows wire bonds 103 connecting the traces 102 on the header 105. For clarity, only some of the wire bonds 103 are shown in FIG. 4. The magnetic-component module 100 can be a transformer with primary and secondary windings that extend around the core 106. Alternatively, other magnetic components can also be used, including, for example, an inductor with a single winding or a transformer with three or more windings. Additionally, the windings 101 can have any suitable number of turns and can have one or more taps. As shown in FIG. 2, the header 105 can include ridges 107 or other suitable surface-mount (SM) structures that can be located on the bottom surface of the header 105 that can be used to attach the header 105 to a substrate (not shown in FIGS. 1-4). FIG. 2 shows three ridges 107, but any number of ridges 107 can be used. Any suitable substrate can be used, including, for example, a printed circuit board (PCB).

As shown in FIG. 1, the header 105 can include a body that can include a generally disc-shaped portion that supports the core 106 and a cylinder-shaped portion that can be inserted into the hole of the core 106. FIG. 1 also shows traces 102 that are provided on the header 105 and that generally extend radially from the center to the outer perimeter of the header 105. As shown, the header 105 can also include core standoffs 108 that protrude from the body between traces 102 and are taller than the traces 102 so that the core 106 does not contact the traces 102. FIG. 1 shows three core standoffs 108 that are used to space a core 106 from the traces 102. Any number of core standoffs 108 can be used. Alternatively, no core standoffs can be used if the core 106 and/or the traces 102 are insulated. The core 106 can rest on the header 105 or can be attached to the header 105 in any suitable manner. The center of the header 105 can include a platform 109 attached to the header 105. The platform 109 can be attached to the header 105 by four arms or any suitable number of arms. Alternatively, the platform 109 can be attached without any arms so that the top surface defined by the platform 109 is solid without holes. If the platform 109 is connected to the header 105 with arms so that there are holes on the top surface defined by the platform 109, then overmold material can flow into the interior of the header 105 through the holes. The platform 109 can be used for pick-and-place placement.

FIG. 2 is a perspective view of the underside of the header 105 shown in FIG. 1. FIG. 2 shows that plating of some of the traces 102 can be extended from the top side of the header 105 around the edge to the bottom side of the header 105 so that these traces 102 can be electrically connected to pads on a substrate (not shown in FIG. 2). The traces 102 can extend onto the ridges 107 on the underside of the header 105.

FIG. 3 shows a core 106 located over the header 105, where the cylinder-shaped portion of the header 105 is taller than the core 106. The core 106 can rest on the core standoffs 108, away from the traces 102 to eliminate short circuiting between the core 106 and the traces 102. However, the core 106 and or traces 102 can be covered or partially covered in insulating material, which can eliminate the need for core standoffs 108.

FIG. 4 shows a header 105 with traces 102, a core 106, and wire bonds 103 that are bonded to the header 105 to connect the traces 102 on the header 105 to define a winding. The wire bonds 103 can connect adjacent traces 102 on the header 105.

Figure 5:
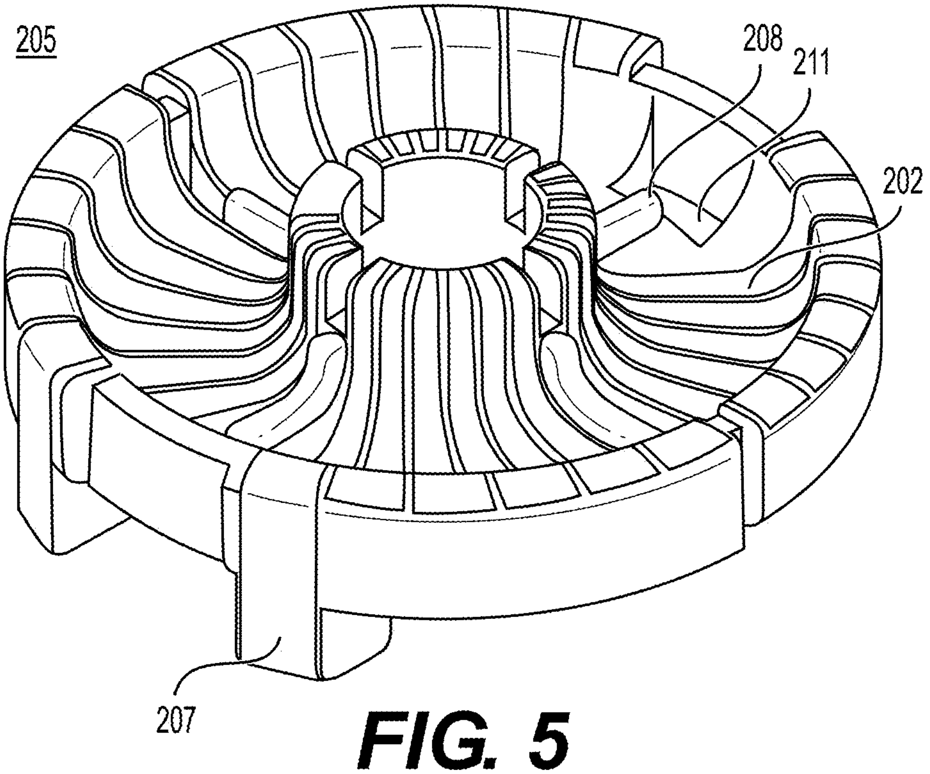
FIGS. 5 and 6 show the top and bottom of a header in the shape of a cup and with standoffs.
Figure 6:
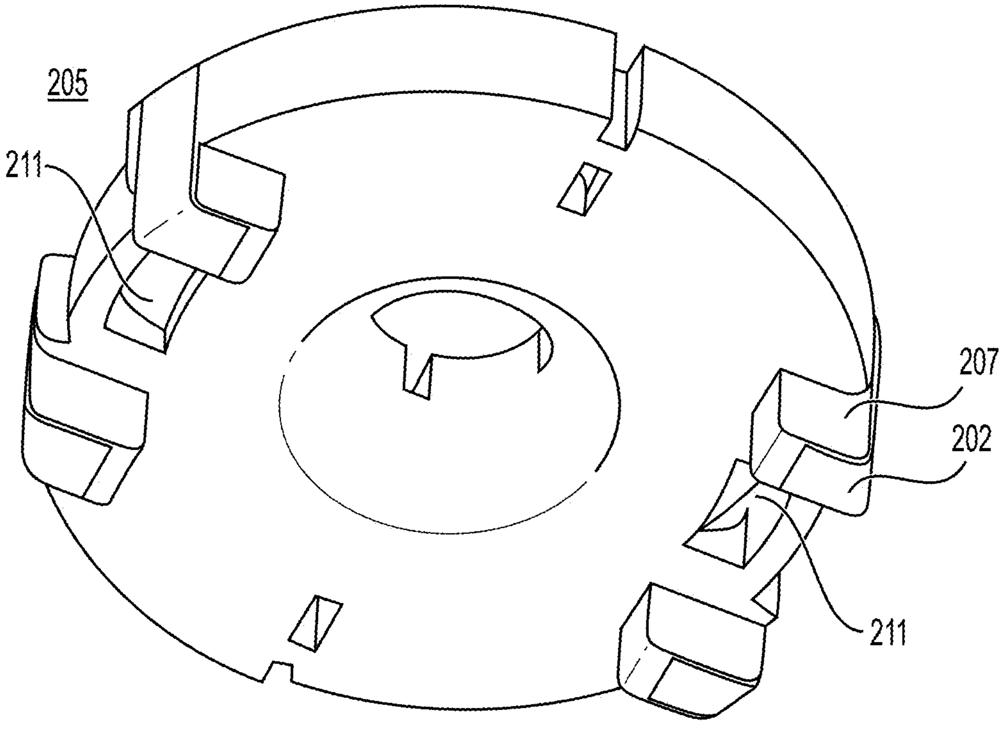
Figure 7:
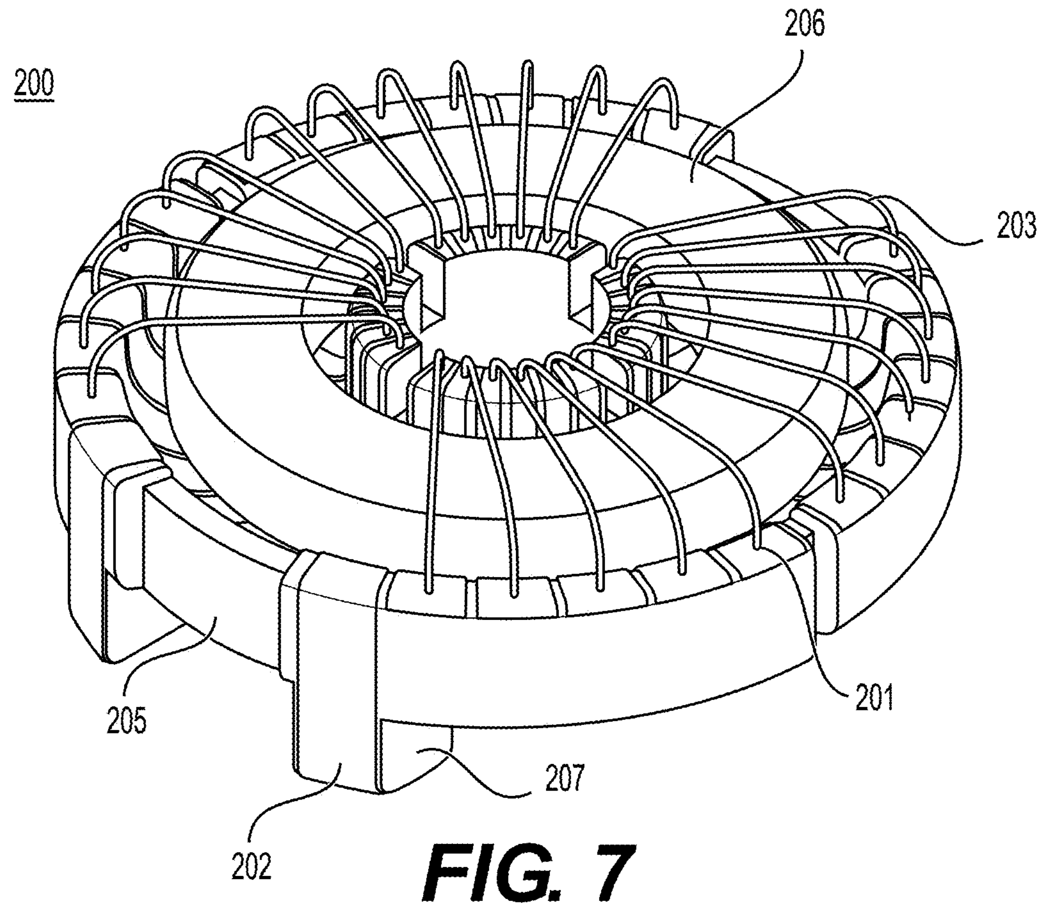
FIG. 7 shows the header of FIG. 5 with a core and wire bonds.
Figure 8:
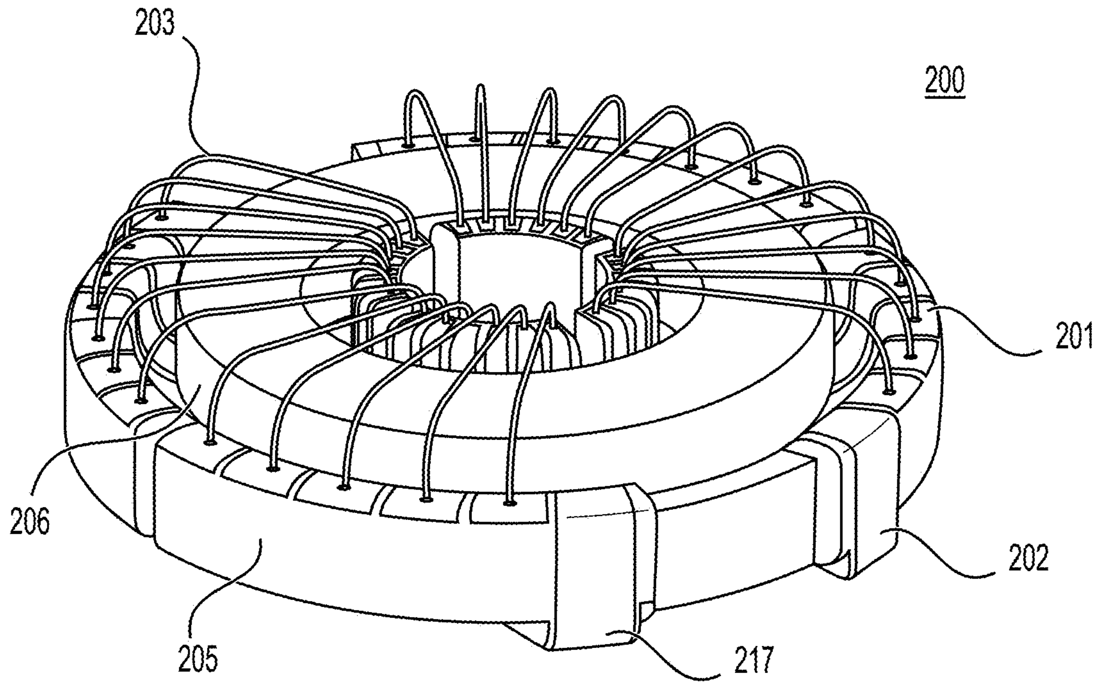
FIG. 8 shows a header in the shape of a cup and with short standoffs.
Figure 13:
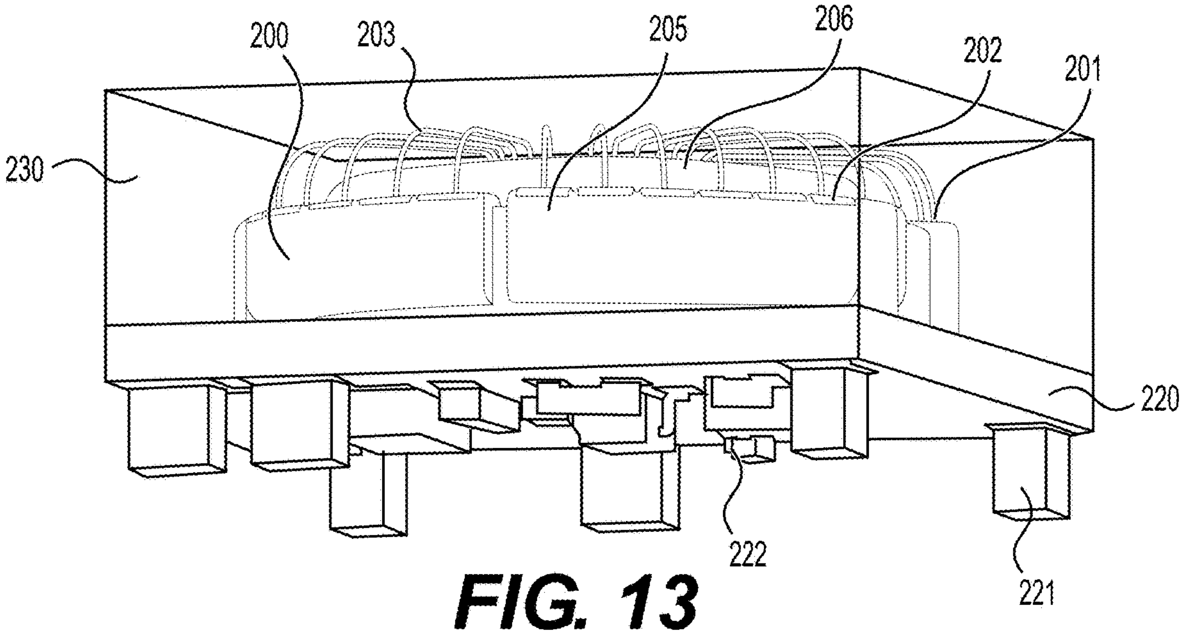
FIG. 13 show a magnetic-component module connected to a substrate and overmolded.
Figure 14:
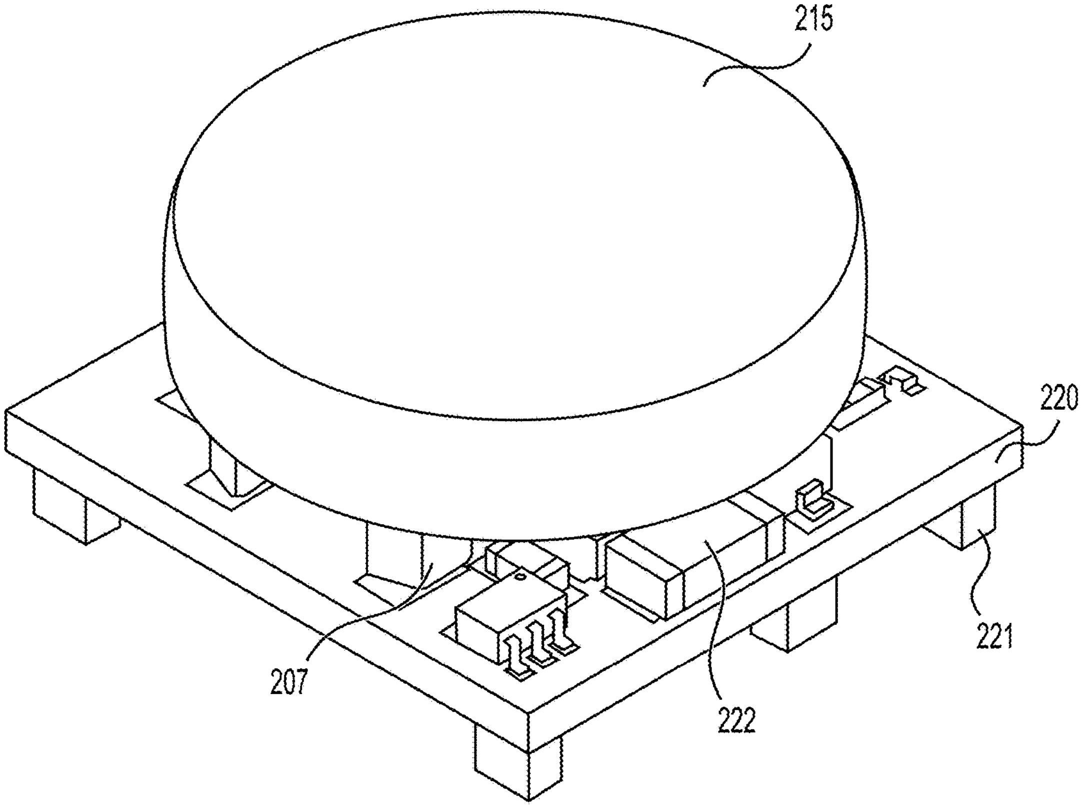
FIG. 14 shows a magnetic-component module with a cap connected to a substrate.
Figure 15:
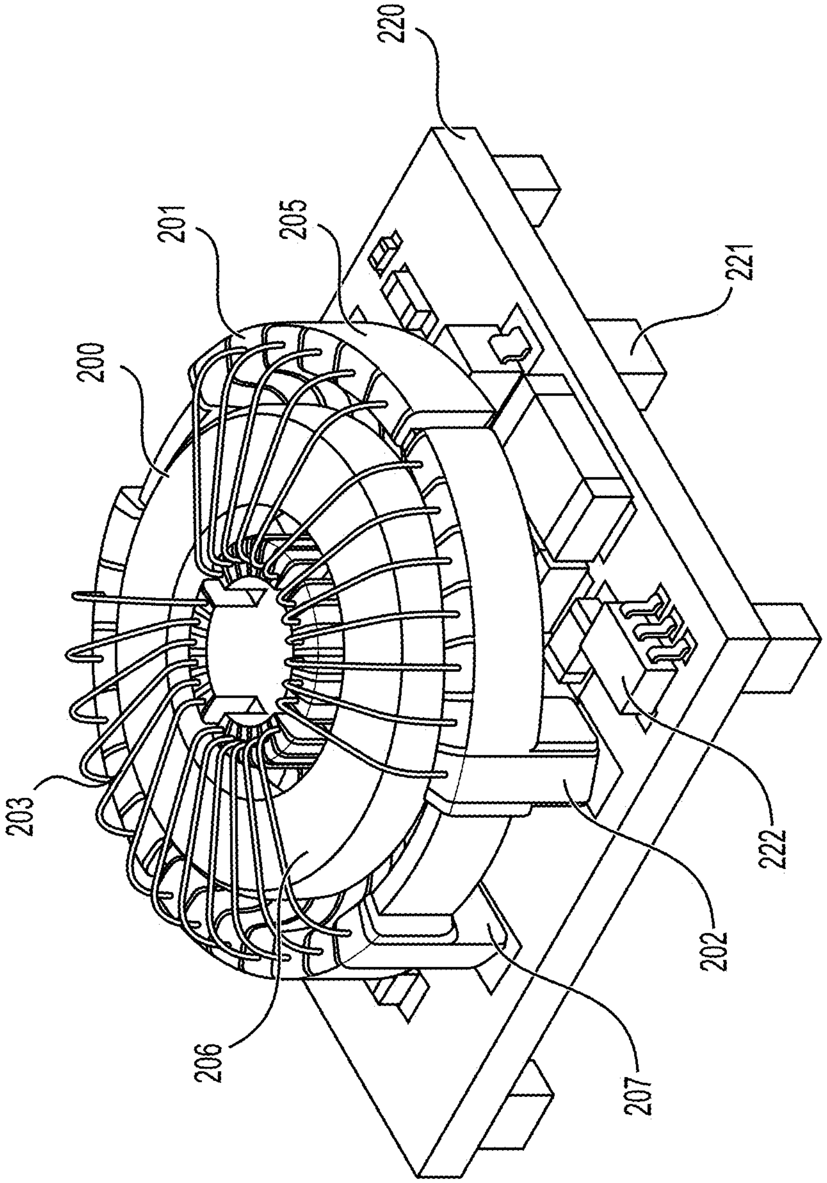
FIG. 15 shows the magnetic-component module of FIG. 14 without a cap.

FIGS. 5-7 show a magnetic-component module 200 with a core 206, winding(s) 201, and a header 205. The windings 201 can be defined by traces 202 on the header 205 and by wire bonds 203 over the core 206. FIGS. 5 and 6 show the header 205 with a cup shape with a hole in the middle. The header 205 can be made by molding and can include traces 202 and core standoffs 208. The traces 202 defining the windings 201 can be provided by plating, vapor deposition, or any other suitable process. FIG. 7 shows a core 206 on the header 205 and wire bonds 203 connecting the traces 202 on the header 205. The magnetic-component module 200 can be a transformer with primary and secondary windings that extend around the core 206. Alternatively, other magnetic components can also be used, including, for example, an inductor with a single winding or a transformer with three or more windings. Additionally, the windings 201 can have any suitable number of turns and can have one or more taps. As shown in FIG. 6, the header 205 can include standoffs 207 or other suitable surface-mount (SM) structures that can be located on the bottom surface of the header 205 that can be used to attach the header 205 to a substrate (not shown in FIGS. 5-7). FIG. 8 shows that short standoffs 217 can be used instead of standoffs 207. The standoffs 207 allow the header 205 to be attached to a substrate with electronic components between the header 205 and the substrate, as shown in FIGS. 14 and 15, while the short standoffs 217 allow the header 205 to be attached to a substrate without any components between the header 205 and the substrate, as shown in FIG. 13. FIG. 6 shows four standoffs 207, but any number of standoffs 207 can be used. Any suitable substrate can be used, including, for example, a printed circuit board (PCB).

Figure 9:
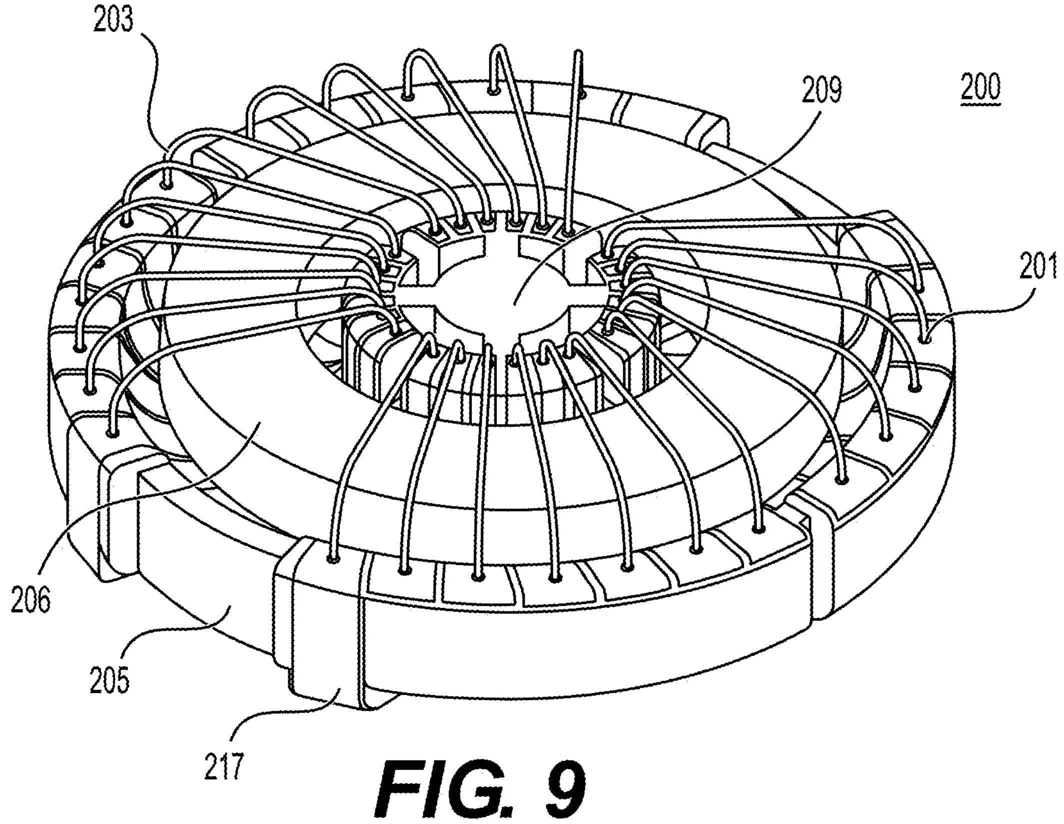
FIG. 9 shows a header in the shape of a cup with a pick-and-place surface.

As shown in FIG. 5, the header 205 can include a cup-shaped body with inner and outer rims. The inner rim can be taller than the outer rim as shown in FIG. 5. Alternatively, the inner and outer rims can have the same height or substantially the same height within manufacturing tolerances. The header 205 can include a body that can include a generally disc-shaped portion from which the inner and outer rims extend and that supports the core 206 and that can include a cylinder-shaped portion the defines the inner rim and that can be inserted into the hole of the core 206. The header 205 can include holes 211 that can allow the windings 201 to be encapsulated if the header 205 is used with a cap 215 as shown, for example, in FIG. 14. FIG. 5 also shows traces 202 that are provided on the header 205 and that generally extend radially from the center to the outer rim of the header 205. As shown, the header 205 can also include core standoffs 208 that protrude from the body between traces 202 and are taller than the traces 202 so that the core 206 does not contact the traces 202. FIG. 5 shows four core standoffs 208 that are used to space a core 206 from the traces 202. Any number of core standoffs 208 can be used. Alternatively, no core standoffs can be used if the core 206 and/or the traces 202 are insulated. The core 206 can rest within the header 205 or can be attached to the header 205 in any suitable manner. As shown in FIG. 9, the center of the header 205 can include a platform 209 attached to the header 205. The platform 209 can be attached to the header 205 by four arms or any suitable number of arms. Alternatively, the platform 209 can be attached without any arms so that the top surface defined by the platform 209 is solid without holes. If the platform 209 is connected to the header 205 with arms so that there are holes on the top surface defined by the platform 209, then overmold material can flow into the interior of the header 205 through the holes. The platform 209 can be used for pick-and-place placement.

FIG. 6 is a perspective view of the underside of the header 205 shown in FIG. 5. FIG. 6 shows that plating of some of the traces 202 can be extended from the top side of the header 205 around the edge to the bottom side of the header 205 so that these traces 202 can be electrically connected to pads on a substrate (not shown in FIG. 6). The traces 202 can extend onto the standoffs 207 on the underside of the header 205. The standoffs 207 can have any suitable height and can be tall enough, for example, to allow electronic components to be located underneath the header 205 when the header 205 is attached to a substrate. As an alternative to having the traces 202 extend to the underside of the header 205, wire bonds (not shown) can connect the windings directly to pads on a substrate.

FIG. 7 shows a core 206 located over the header 205. The core 206 can rest on the core standoffs 208, away from the traces 202 to eliminate short circuiting between the core 206 and the traces 202. However, the core 206 and/or the traces 202 can be covered or partially covered in insulating material, which can eliminate the need for core standoffs 208.

FIG. 7 shows a header 205 with traces 202, a core 206, and wire bonds 203 that are bonded to the header 205 to connect the traces 202 on the header 205 to define a winding. The wire bonds 203 can connect adjacent traces 202 on the header 205. The wire bonds 203 extend between the inner and the outer rims of the header 205.

Figure 10:
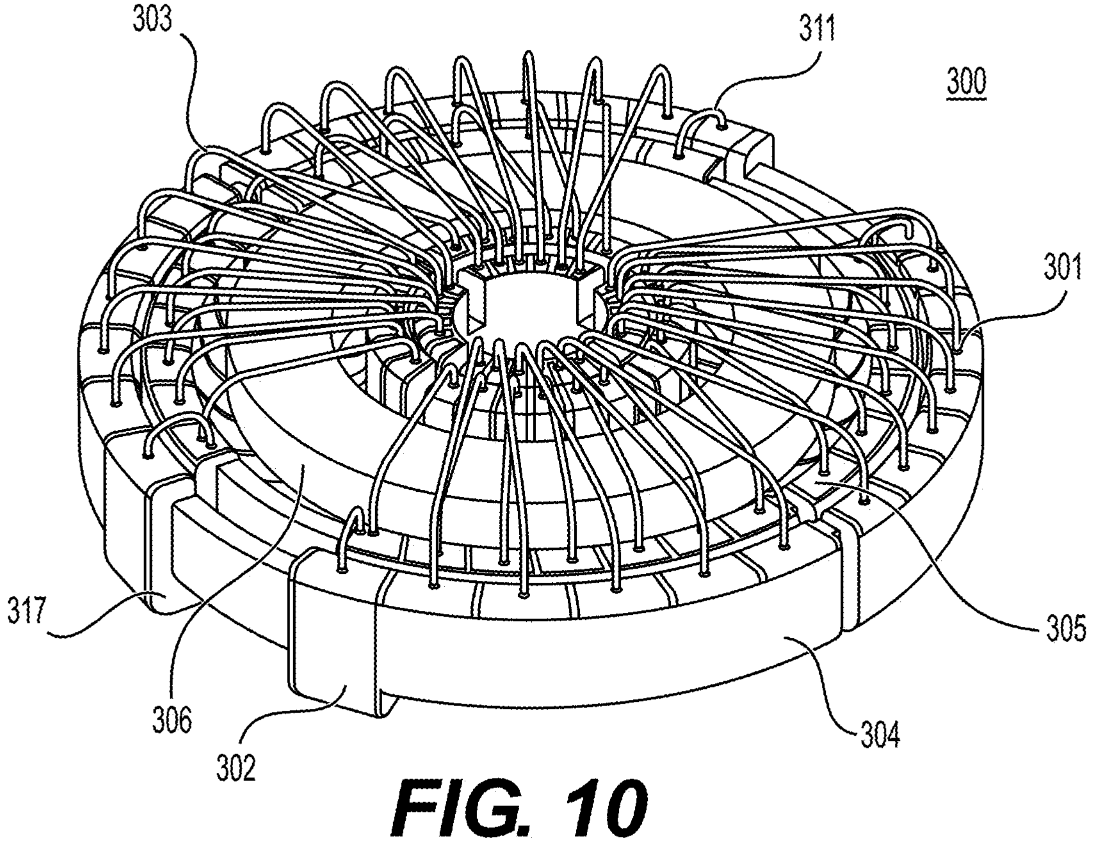
FIG. 10 shows stacked first and second headers.
Figure 11:
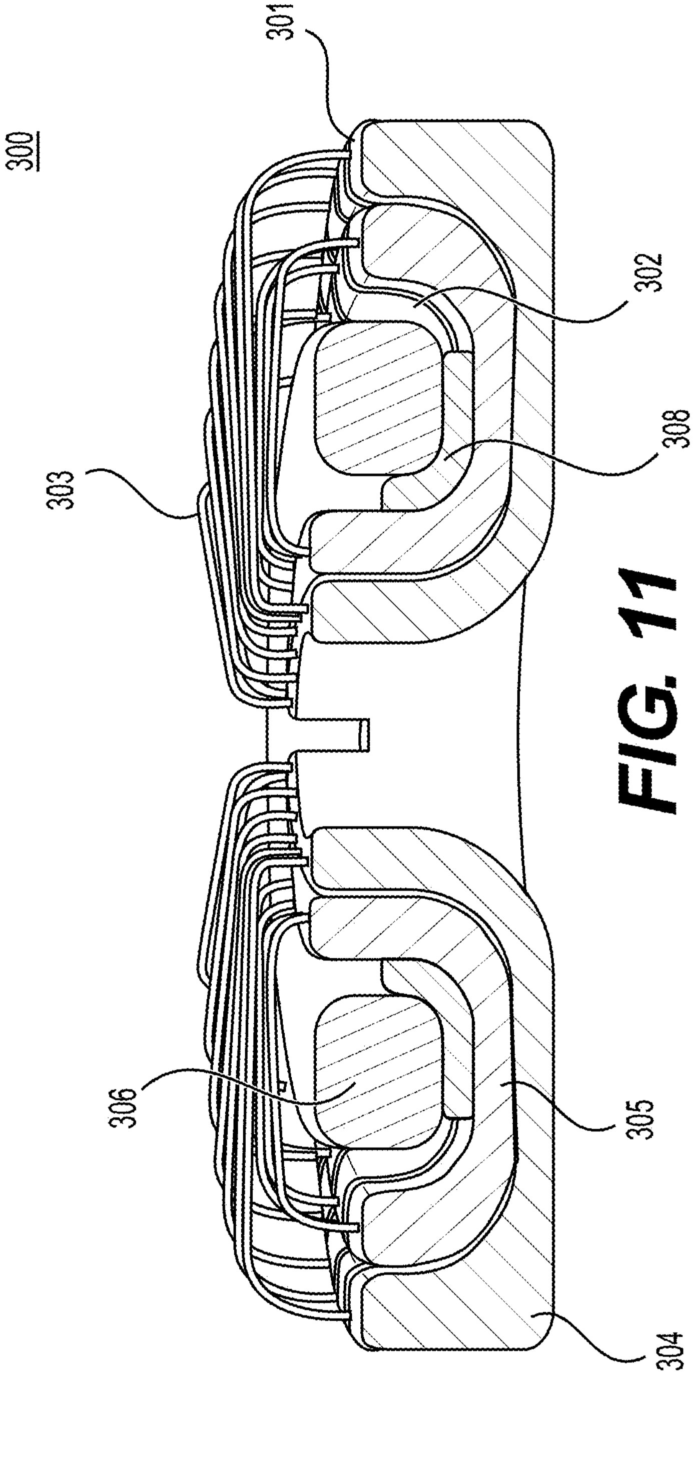
FIG. 11 is a cross-sectional view of the stacked first and second headers of FIG. 10.
Figure 12:
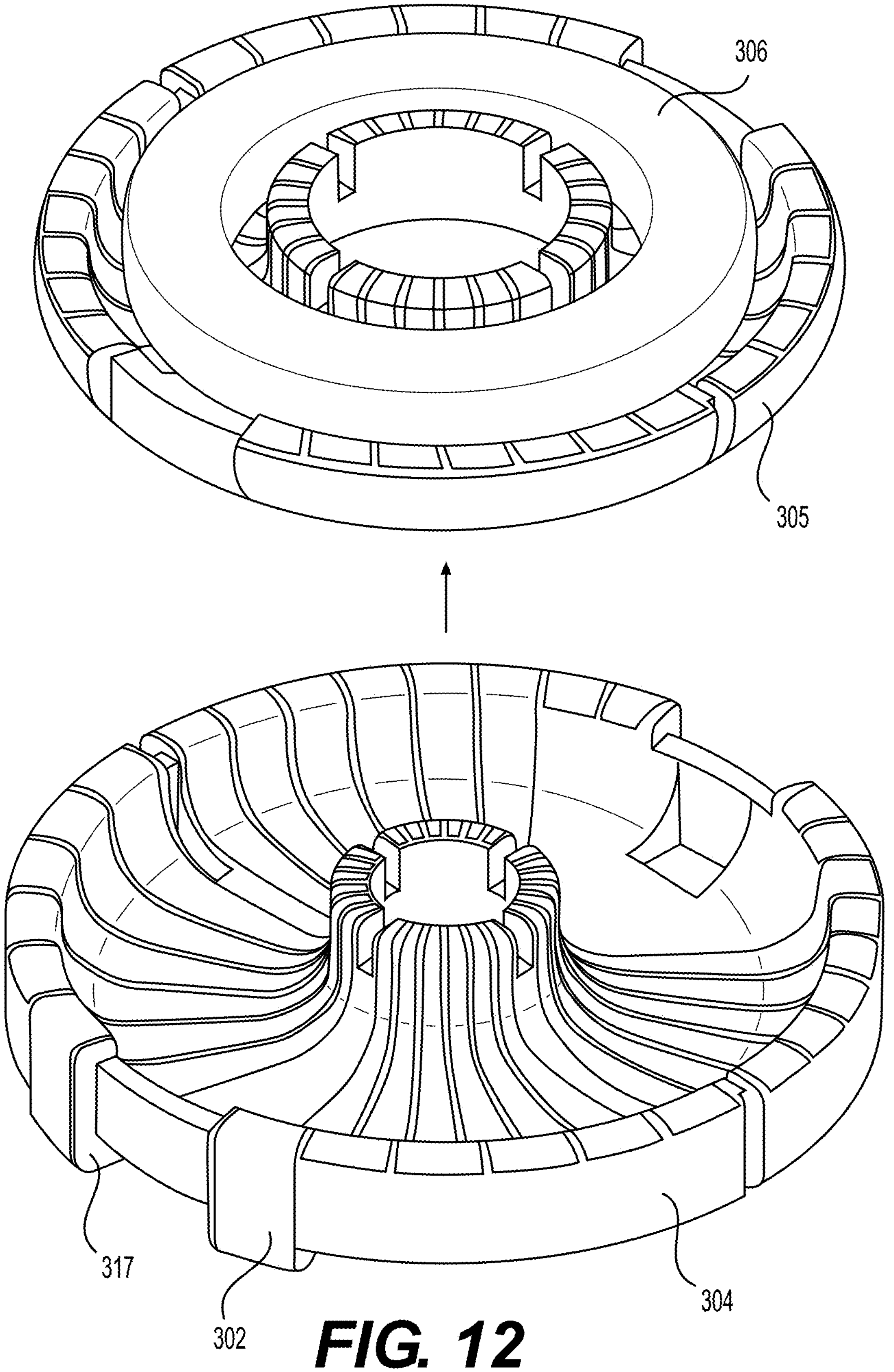
FIG. 12 is an exploded view of the first and second headers.

FIGS. 10-12 show a magnetic-component module 300 with a first header 304 and a second header 305 that are stacked and a core 306 located on the first header 304 and the second header 305. The core 306 can rest on the core standoffs 308, away from the traces 302 to eliminate short circuiting between the core 306 and the traces 302. However, the core 306 and/or the traces 302 can be covered or partially covered in insulating material, which can eliminate the need for core standoffs 308. FIG. 11 is a sectional view of the first header 304 and second header 305 shown in FIG. 10. FIG. 12 is an exploded view of the first header 304 and second header 305 showing that the first header 304 can be arranged to fit inside the second header 205. In FIG. 12, the core 306 is in the second header 305 as the first header 304 is inserted into the second header 305. Alternatively, the first header 304 can be inserted into the second header 305 before the core 306 is placed into the second header 305. The windings 301 can be defined by traces 302 on the first header 304 and the second header 305 and by wire bonds 303 over the core 306. The first header 304 and the second header 305 can be connected by wire-bond jumpers 311. Although only the first header 304 and the second header 305 are shown in FIGS. 10-12, additional headers can be stacked on the first header 304 and the second header 305. Each additional header creates additional windings 301. The center of the second header 305 can include a platform (not shown), which can be used for pick-and-place placement. The first header 304 can include short standoffs 317 as shown in in FIG. 10, which allow the first header 304 to be attached to a substrate without any components between the first header 304 and the substrate, as shown in FIG. 13. Alternatively, the first header 304 can include standoffs that allow the first header 304 to be attached to a substrate with electronic components between the first header 304 and the substrate, as shown in FIGS. 14 and 15. The first header 304 and the second header 305 can including key and/or polarization structures that orient the first header 304 and the second header 305 with respect to each other as the first header 304 is inserted into the second header 305 and to fix relationship between the first header 304 and the second header 305 so that the first header 304 and the second header 305 do not rotate with respect to each other.

FIG. 13 shows magnetic component module 200 with a header 205 connected to a substrate 220. The short standoffs 217 of the header 205 can be soldered to the substrate 220 to create an electrical and mechanical connection between the magnetic component module 200 and the substrate 220. Circuitry components and/or connectors 222 can be located on the bottom surface of the substrate. FIG. 13 also shows that the header and the wire bonds can be overmolded with an overmold material 230. The overmold material 230 can include any suitable overmold material. For clarity, the overmold material 230 is shown as transparent in FIG. 13, but the overmold material 230 does not need to be transparent. Although FIG. 13 shows a substrate 220 with no internal layers, it is also possible to use a multilayer substrate. The substrate 220 can include standoffs 221 that can be attached to a host substrate (not shown).

FIGS. 14 and 15 show a magnetic-component module 200 with a header 205 connected to a substrate 220 by standoffs 207 on the header 205. Instead of the standoffs 207, the header 205 can be attached to the substrate 220 with any suitable structure, including, for example, a lead frame. The lead frame can be made from any suitable conductive material. As shown in FIG. 14, the magnetic-component module 200 can include a cap 215 that covers the header 205. The cap 215 can include a structure, for example, a standoff, stop, lug, etc., that prevents the caps 215 from coming into contact with the wire bonds 203. FIG. 14 shows that the cap 215 can cover the core 206, the wire bonds 203, and portions of the header 205. The standoffs 207 of the header 205 can be mounted on a substrate 220 with a space between the bottom of the header 205 and the top surface of the substrate 220. The space between the header 205 and the substrate 220 can be used to mount circuitry components and other electronic components 222 and to increase the surface area of the magnetic-component module 200 to facilitate cooling. The standoffs 207 of the header 205 can be used to save space and increase circuit density. Although FIGS. 14 and 15 show the substrate 220 with no internal layers, it is also possible to use a multilayer substrate. The substrate 220 can include standoffs 221 that can be attached to a host substrate (not shown).

Figure 16:
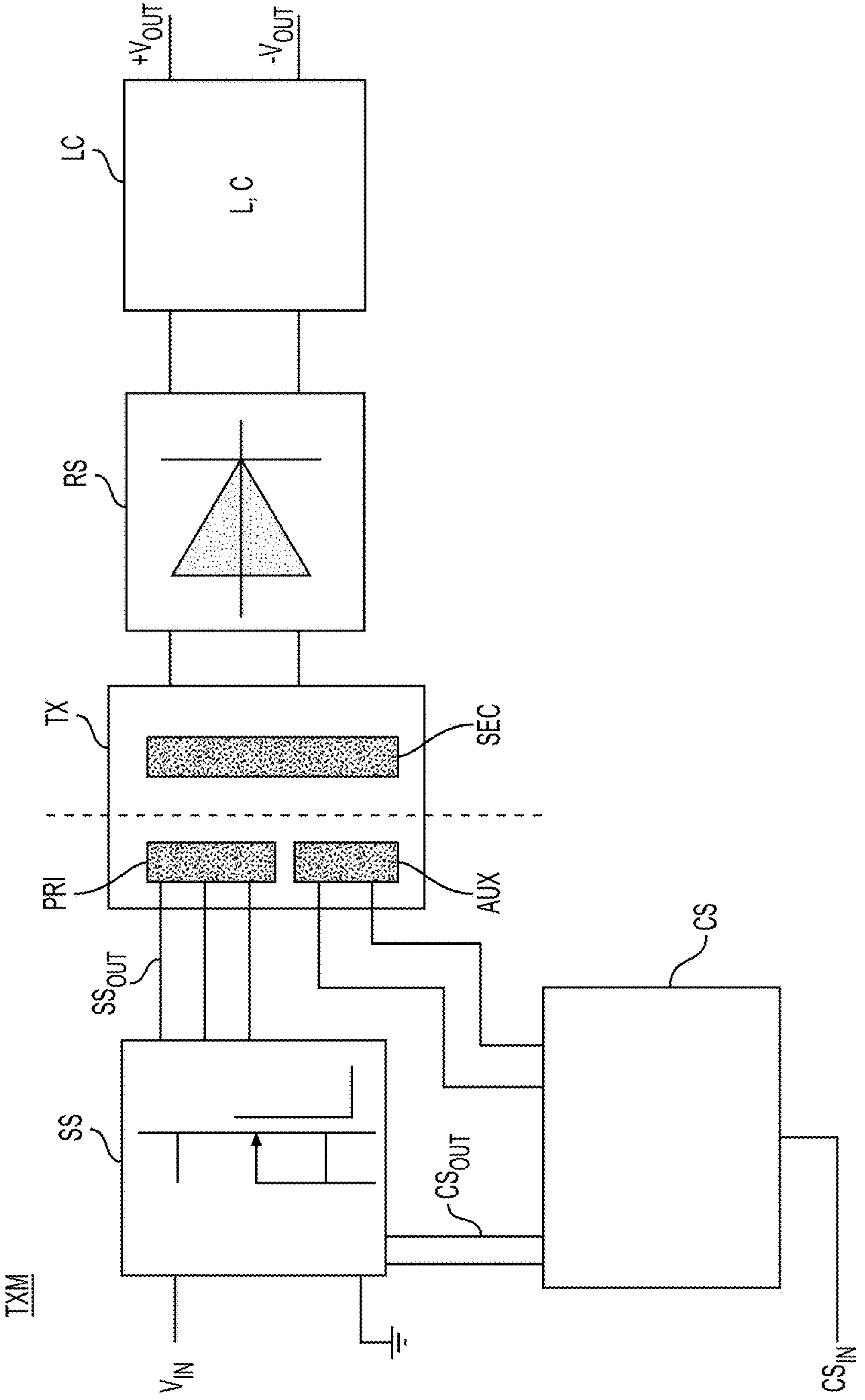
FIG. 16 is a block diagram of an example of an implementation of a magnetic-component module.

FIG. 16 is a block diagram of an example of an implementation of a magnetic-component module TXM. In FIG.

16, the magnetic-component module TXM is implemented as an isolated converter with the dashed line through the transformer TX showing the isolation boundary. The primary side that is on the left side of FIG. 16 and that is connected to the primary winding PR is isolated from the secondary side that is on the right side of FIG. 16 and that is connected to the secondary winding SEC. For example, FIG. 16 shows that the electronic module TXM can include a switching stage SS, a control stage CS, a transformer TX, a rectifier stage RS, and an output filter LC. The transformer TX can include the core and windings that are defined by wire bonds and traces as previously described. The circuitry and components other than the transformer TX can include other electronic components that are attached to the substrate or PCB on which the transformer TX is mounted, as previously described.

As shown in FIG. 16, the switching stage SS receives an input voltage Vin and outputs a voltage SSout to at least one primary winding PRI of the transformer TX. The switching stage can include switches or transistors that control the flow of power. The control stage CS includes an input control signal CSin. The control stage CS can control the switching of the switches in the switching stage SS and can monitor the transformer TX via an auxiliary winding AUX. The dotted vertical line through the transformer TX represents the galvanic isolation between the primary winding PRI and the auxiliary winding AUX from the secondary winding SEC. The secondary winding of the transformer TX can be connected to a rectifier stage RS that in turn is connected to an output filter LC that outputs a DC voltage between +Vout and −Vout. The rectifier stage can include diodes and/or synchronous rectifiers that rectify the voltage at the secondary winding SEC. The output filter LC can include an arrangement of inductor(s) and capacitor(s) to filter unwanted frequencies.

Figure 17:
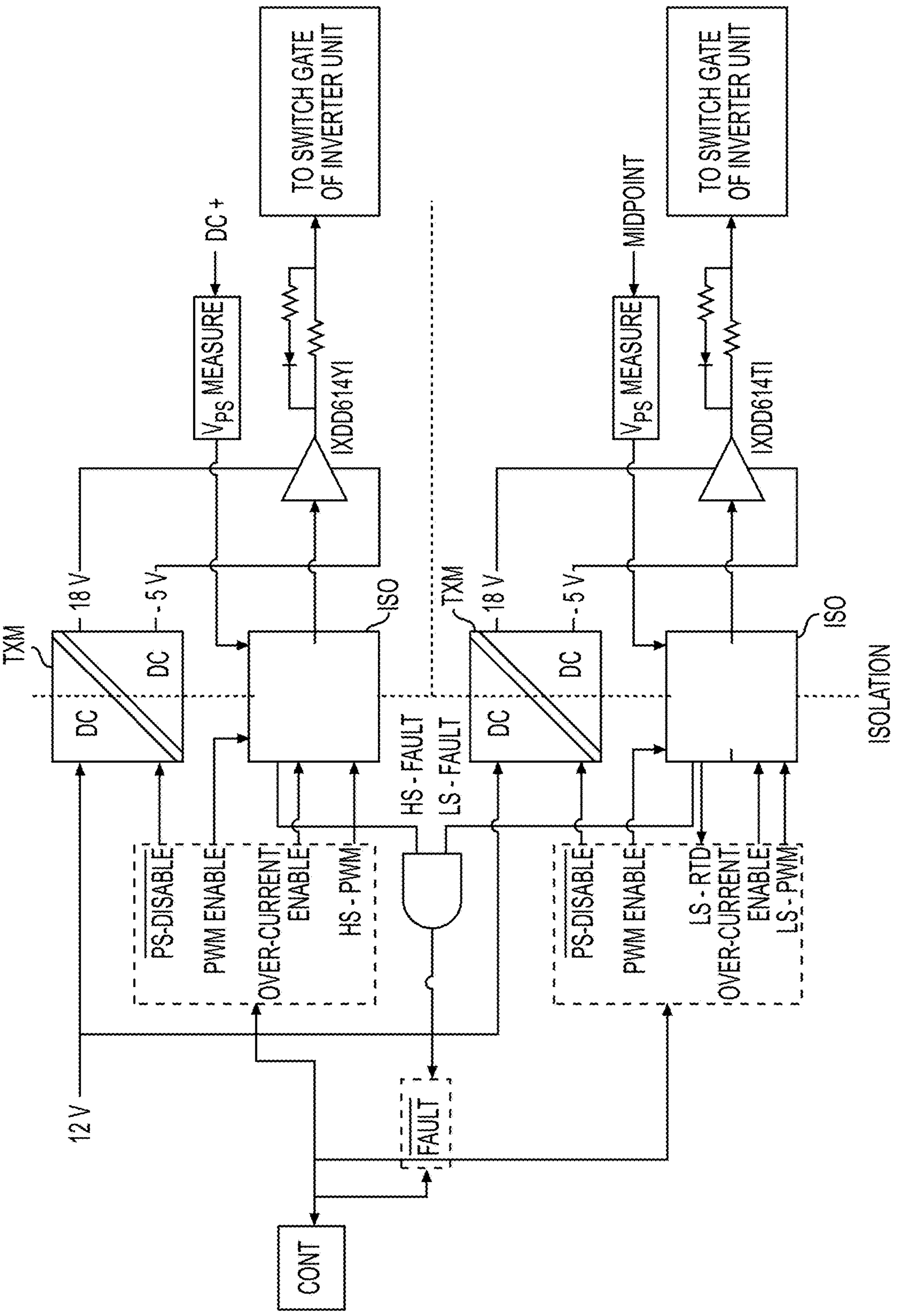
FIG. 17 is a block diagram of a gate-drive-circuit application that can include one or more of the magnetic-component modules shown in FIG. 16.

FIG. 17 is a block diagram of a gate-drive-circuit application that can include one or more of the magnetic-component modules TXM shown in FIG. 16. The vertical and horizontal dotted lines represent galvanic isolation. FIG. 17 shows that the magnetic-component modules TXM can include, for example, a +12 Vdc input and −5 Vdc and +18 Vdc outputs, which could be used, for example, to drive metal-oxide-semiconductor field-effect transistor (MOSFETs) or insulated-gate bipolar transistors (IGBTs). The outputs of the magnetic-component modules TXM can be connected to gate driver IXDD614YI. A controller CONT can transmit and receive control signals represented by those control signals shown in the dotted-line boxes, including, for example, power-supply disable, pulse-width modulation PWM enable, low-side and high-side PWM, over-current detection, etc. The control signals can be transmitted and received between the controller CONT and the isolation circuitry ISO and between the controller CONT and the magnetic-component modules TXM. The isolation circuitry ISO can receive and transmit feedback signals $V_{DS}$ Measure. The isolation circuitry can include a transformer, a capacitor, an opto-coupler, a digital isolator, and the like. The output of the gate drive circuit can be connected to a gate of a switch located in an inverter-unit circuitry as a portion of an inverter for a motor control application as shown in FIG. 18.

Figure 18:
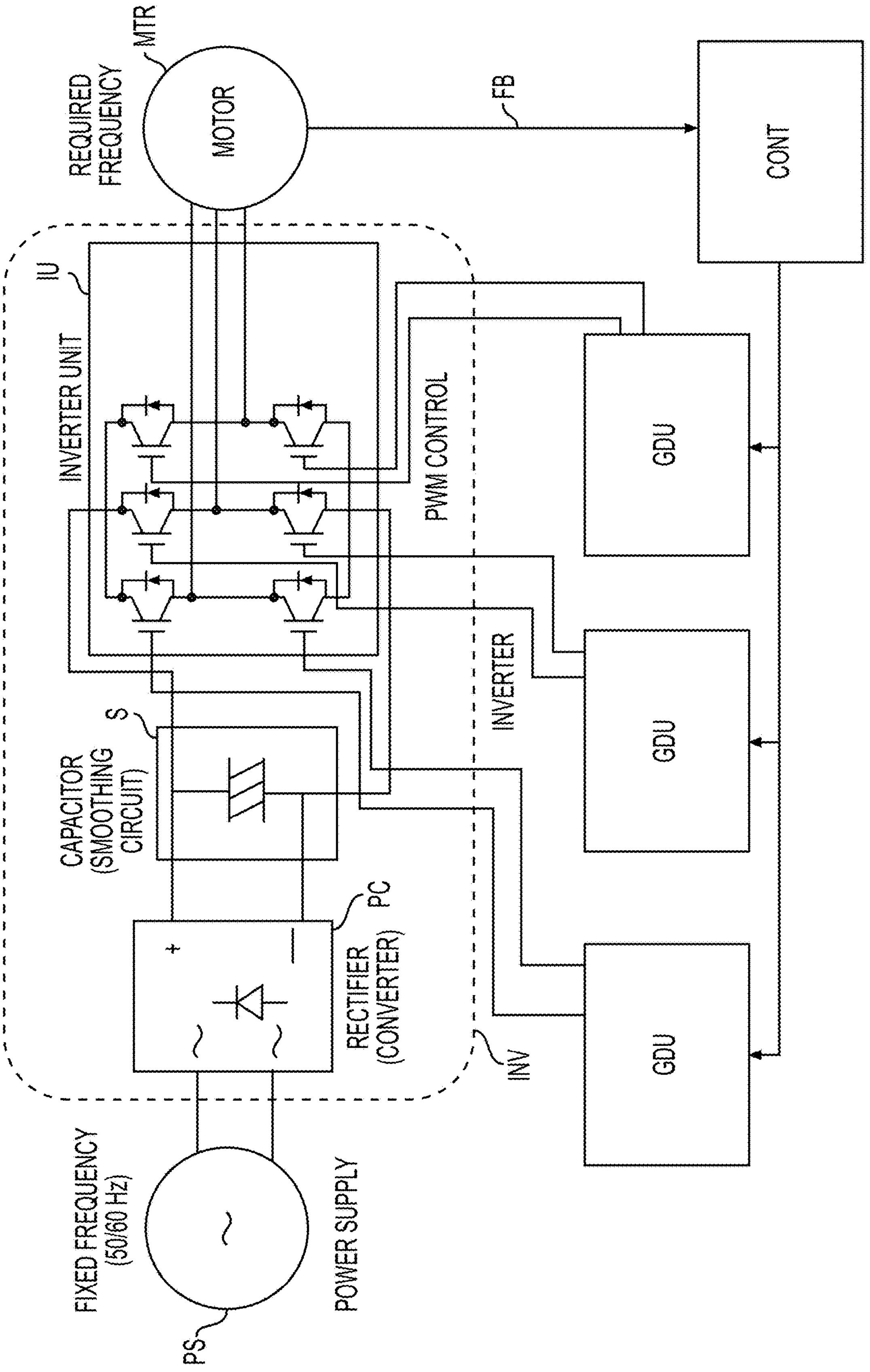
FIG. 18 is a circuit diagram of a motor control application that can include the gate drive units of FIG. 17.

FIG. 18 shows circuitry for a motor control application that can include a power supply PS running at a fixed frequency of 50 Hz or 60 Hz, for example, an inverter INV, and a motor MTR running at its required frequency. As shown, the inverter INV can include a power converter PC, a smoothing circuit S, and inverter unit circuitry IU controlled with PWM control. FIG. 18 shows that a controller CONT can be included to control the gate drive units GDU of FIG. 17. The gate drive units GDU can control the gates of the switches within the inverter unit circuitry IU. Feedback FB can be provided to the controller CONT from the motor MTR to stabilize control of the gate drive units GDU.

A package including the magnetic-component module can be any size. For example, the package can be about 12.7 mm by about 10.4 mm by about 4.36 mm. A package with these dimensions can provide higher isolation. The magnetic-component module can be used in many different applications, including, for example, industrial, medical, and automotive applications. For example, as explained above, the magnetic-component module can be included in a gate drive. The magnetic-component module can provide 1 W-2 W of power with an efficiency of greater than 80% and can provide 3 kV or 5 kV breakdown rating depending on the footprint of the magnetic-component module, for example. The magnetic-component module can include UL-required reinforced isolation and can operate at temperatures between about −40° C. and about 105° C. or between about −40° C. and about 125° C., for example. The magnetic-component module can have a moisture sensitivity level (MSL) of 1 or 2, for example, depending on the application. The magnetic component module can be used in battery management systems or programmable logic controller and data acquisition and communication compliant with RS484/232.

If the magnetic-component module includes a transformer, then, for example, the primary winding can include at least 20 turns and the secondary winding can include 12 turns. The coupling factor of the transformer can be 0.99, for example. The primary windings can have a direct-current resistance (DCR) of about 17.8 Ω/turn, and the secondary windings can have DCR of about 16.9 Ω/turn, for example. The maximum current can be 600 mA (over-current protection) with typical current being 300 mA, for example, to ensure that the magnetic-component module is not damaged in such over-current situations. The core can have an inner diameter of about 5.4 mm, an outer diameter of about 8.8 mm, and a height of about 1.97 mm, for example. The spacer can have an inner diameter of about 5.1 mm, an outer diameter of about 8.8 mm, and a height of about 0.2 mm, for example. The transformer can have size of about 12.7 mm by about 10.4 mm by about 2.5 mm, for example. The core can be made of any suitable material, including, for example, Mn—Zn, Ni—Zn, FeNi, and the like. The spacer can be made of any suitable material, including, for example, an epoxy adhesive. The wire bonds can be made of any suitable material, including, for example, Al or Cu. The pins can be made of any suitable material, including, for example, Cu with Ni—Sn coating. The overmold material can be made of any suitable material, including, for example, epoxy resin.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A magnetic-component module comprising:

a first header is a molded header;

a core on the first header; and a winding including a first trace and an additional trace on the first header; wherein the first header includes:

a disc-shaped portion that extends only along on a bottom surface of the core and that supports the core;

standoffs extending from the disc-shaped portion; and a cylinder-shaped portion that receives a hole of the core, the first trace extends along the disc-shaped portion adjacent a bottom surface of the core and extends along the cylinder-shaped portion adjacent an inner surface of the core, and the additional trace extends from a top side of the first header to a bottom side of a corresponding standoff of the standoffs such that the additional trace electrically connects to a pad on a substrate, when the first header is connected to the substrate.

2. The magnetic-component module according to claim 1, further comprising a core standoff between the first header and the core.

3. The magnetic-component module according to claim 1, wherein the first trace is electrically connected to the substrate.

4. The magnetic-component module according to claim 1, further comprising a second header including a first trace.

5. The magnetic-component module according to claim 4, wherein the second header is stacked on the first header.

6. The magnetic-component module according to claim 5, further comprising:

a second trace on the first header;

a second trace on the second header;

a first wire bond over the core and connecting the first trace on the first header to the second trace on the first header; and a second wire bond over the core and connecting the first trace on the second header to the second trace on the second header.

7. The magnetic-component module according to claim 6, further comprising an overmold material encapsulating the first header, the core, the second header, the first wire bond, and the second wire bond.

8. The magnetic-component module according to claim 1, further comprising overmold material encapsulating a portion of the first header.

9. The magnetic-component module according to claim 8, wherein electrical components are mounted on the substrate between the first header and the substrate.

10. The magnetic-component module according to claim 1, further comprising a second trace on the first header; and a wire bond over the core and connecting the first trace on the first header to the second trace on the first header.

11. The magnetic-component module according to claim 10, further comprising overmold material encapsulating the first header, the core, and the wire bond.

12. A magnetic-component module comprising:

a first header is a molded header having a cup shape with inner and outer rims and including standoffs that extend from the first header;

a core on the first header; and a winding that includes a first trace and an additional trace on the first header and a first wire bond extending between the inner and outer rims of the first header and connected to the first trace; wherein the first trace extends along the first header adjacent to an inner surface, a bottom surface, and an outer surface of the core, and the additional trace extends from a top side of the first header to a bottom side of a corresponding standoff of the standoffs such that the additional trace electrically connects to a pad on a substrate, when the first header is connected to the substrate.

13. The magnetic-component module according to claim 12, further comprising a core standoff between the first header and the core.

14. The magnetic-component module according to claim 12, further comprising a second header that has a cup shape with inner and outer rims, that includes a second trace, and that is stacked on the first header.

15. The magnetic-component module according to claim 14, further comprising a second wire bond extending between the inner and outer rims of the second header and connected to the second trace.

16. The magnetic-component module according to claim 12, further comprising overmold material encapsulating a portion of the first header.

17. The magnetic-component module according to claim 16, wherein electrical components are mounted on the substrate between the first header and the substrate.

18. The magnetic-component module according to claim 15, further comprising overmold material encapsulating the first header, the core, the first wire bond, and the second wire bond.

19. The magnetic-component module according to claim 1, wherein the standoffs include surface-mount structures or ridges.

20. The magnetic-component module according to claim 12, wherein the standoffs include surface-mount structures or ridges.

* * * * *